(12) United States Patent
Parks

(10) Patent No.: US 6,738,987 B1
(45) Date of Patent: May 25, 2004

(54) SNAP ON, THIGH TO PEDAL, AUXILIARY PROPULSIVE SYSTEM FOR BICYCLES

(76) Inventor: Douglas Harold Parks, 308 Miracle Strip Pkwy. #4B, Fort Walton Beach, FL (US) 32548

( * ) Notice: Subject to any disclaimer, the term of this patent is extended or adjusted under 35 U.S.C. 154(b) by 0 days.

(21) Appl. No.: 10/441,623

(22) Filed: May 20, 2003

(51) Int. Cl.⁷ ................................ A41F 9/00
(52) U.S. Cl. ..................... 2/312; 280/294; 2/1
(58) Field of Search ................ 2/312, 24, 62, 2/22, 79, 227, 1, 232, 233, 242, 311, 313, 317, 326, 330, 331; 280/221, 224, 220, 232, 233, 243, 208, 251, 255, 256, 293, 294

(56) References Cited

U.S. PATENT DOCUMENTS

| | | | | |
|---|---|---|---|---|
| 926,328 A | * | 6/1909 | Horath et al. | 2/24 |
| 4,867,441 A | * | 9/1989 | Blakeman | 482/57 |
| 4,909,526 A | * | 3/1990 | Vazin | 280/230 |
| 5,417,647 A | * | 5/1995 | Down | 602/26 |
| 5,768,702 A | * | 6/1998 | Kim | 2/1 |
| 5,946,721 A | * | 9/1999 | Dance | 2/69 |

FOREIGN PATENT DOCUMENTS

| | | | |
|---|---|---|---|
| DE | 398350 | * | 11/1922 |
| FR | 896837 | * | 3/1945 |

* cited by examiner

Primary Examiner—Tejash Patel (57) ABSTRACT

An auxiliary thigh-to-pedal power system for bicycles, especially attractive for persons interested in low cost, non-polluting, auto traffic avoiding, energy conserving transportation is disclosed, significantly increasing the total force the cyclist can apply to the pedals for each gear ratio. The system attaches to a conventional bicycle while requiring no attachments such as toe clips, cleats or straps to the elements of the bicycle. It allows uninterrupted force to be applied to the pedals throughout the 360° pedaling cycle, the downstroke being maintained on one pedal while the upstroke is being performed on the other pedal. Unlike prior art upstroke utilization schemes, mounting and dismounting can be performed in a safe manner identical to that for a conventional bicycle, and standup cycling is allowed. Hook and loop attachment material and a snap hook are utilized in adjustably coupling the thigh with the inner end of the pedal.

8 Claims, 7 Drawing Sheets

SNAP ON, THIGH TO PEDAL, AUXILIARY PROPULSIVE SYSTEM FOR BICYCLES

FIELD OF THE INVENTION

This invention relates to bicycles and more specifically to the application of upward force to a bicycle pedal by means of an adjustable, removable and easily attached coupling between the inner end of the pedal and the cyclist's thigh.

BACKGROUND OF THE INVENTION

Many devices have been proposed which address the fact that, during the pedaling of a conventional bicycle, force is applied to the pedal primarily during the downstroke. Most of the proposed devices have required the use of toe clips, cleats or straps to secure the foot to the pedal and thus permit force to be applied during the upstroke. Most of the devices also suffer from the fact that the muscles of the secured upper foot are not as strong as several muscles of the leg and thus become the weakest link in a chain that includes the knee and the thigh. In addition, disengaging and re-engaging the foot (as during traffic stops) while using these modified pedals can often be difficult and hazardous. Numerous corrective schemes, often complex and costly, have been invented in attempts to overcome these difficulties and hazards.

Direct use of the strong upper thigh muscles to provide propulsive force during the upstroke has been proposed in at least four patents. U.S. Pat. No. 4,909,526 utilizes parallel ligatures extending from both the inner and outer sides of the pedals through pulleys attached to the thigh and on to a release mechanism attached to the rear bicycle fork. Patent BE398350 utilizes a belt extending around the back and down through dual thigh, calf and ankle straps to dual foot straps attached to each pedal. Patent FR896837 utilizes a rigid frame attached firmly to each thigh by two straps and an adjustable rod extending down from the end of the frame to a foot-enclosing strap attached to the inner and outer sides of each pedal. U.S. Pat. No. 4,867,441 is designed specifically for leg amputees and it requires rigid attachments to both the remaining foot and the thigh.

All of the above devices appear to be difficult and time consuming to attach, expensive to manufacture, and clumsy to utilize. All of the devices require modifications of the pedals and present obvious mounting, dismounting and hazard problems because of the enclosed feet, and they are complicated by a multiplicity of fixed metallic connectors (e.g., bolts, nuts, screws). None of the patents appear to allow stand-up cycling, which is often useful in accelerating and in climbing steep slopes. The present invention overcomes these difficulties and shortcomings.

SUMMARY Of THE INVENTION

The present invention involves the use of an adjustable, removable belt coupling a bicyclist's thigh to the inner end of the bicycle pedal in order to achieve an upward force on the pedal and consequent increase in total power while the conventional downward force on the other pedal takes place. Adjustable hook and loop attachment means are used in coupling the belt and thigh; either snap hook means or hook and loop attachment means can be used in coupling the belt and pedal. Conventional mounting/dismounting and standup pedaling are allowed. Unlike the prior art cases, the emphasis in developing the present invention has been on safety, low manufacturing cost, attachment simplicity, and ease of operation.

OBJECTS OF THE PRESENT INVENTION

It is a principal object of the present invention to provide increased total propulsive force to the pedals of a conventional bicycle and increased total watts of power for each gear ratio while requiring no modifications of the bicycle elements and allowing easy attachment of the invention.

It is another object of the present invention to allow older cyclists to maintain pace with younger cyclists. The strength to propel a bicycle diminishes with old age. The use of the present invention can thus be of special advantage in retirement communities, where bicycling is a common, healthful, economical form of transportatation in times of rising fuel costs.

It is another object of the present invention to allow force to be applied to each pedal over the entire 360° rotational cycle.

It is another object of the present invention to allow the user of the invention to easily mount or dismount the pedals during planned or emergency stops in a manner similar to that for conventional platform pedals. No toe cleats, clips or ankle straps are required.

It is another object of the present invention to allow stand-up pedaling for acceleration and the climbing of steep slopes.

It is another object of the present invention to reduce vibrations and oscillations common to bicycles in which forces are applied alternately on opposite sides of the bicycle. The present invention applies forces concurrently on opposite sides of the bicycle and, therefore, should reduce these detrimental effects.

It is another object of the present invention to allow easy adjustment of the belt connection to the thigh while the bicycle is in motion in order to make desired changes in force on the pedal.

It is another object of the present invention to allow any combination of upward and downward forces on the pedals: upward force only, downward force only or combined upward and downward forces. This allows comfortable cycling to be performed despite foot and ankle pain or injury.

Figure 8:
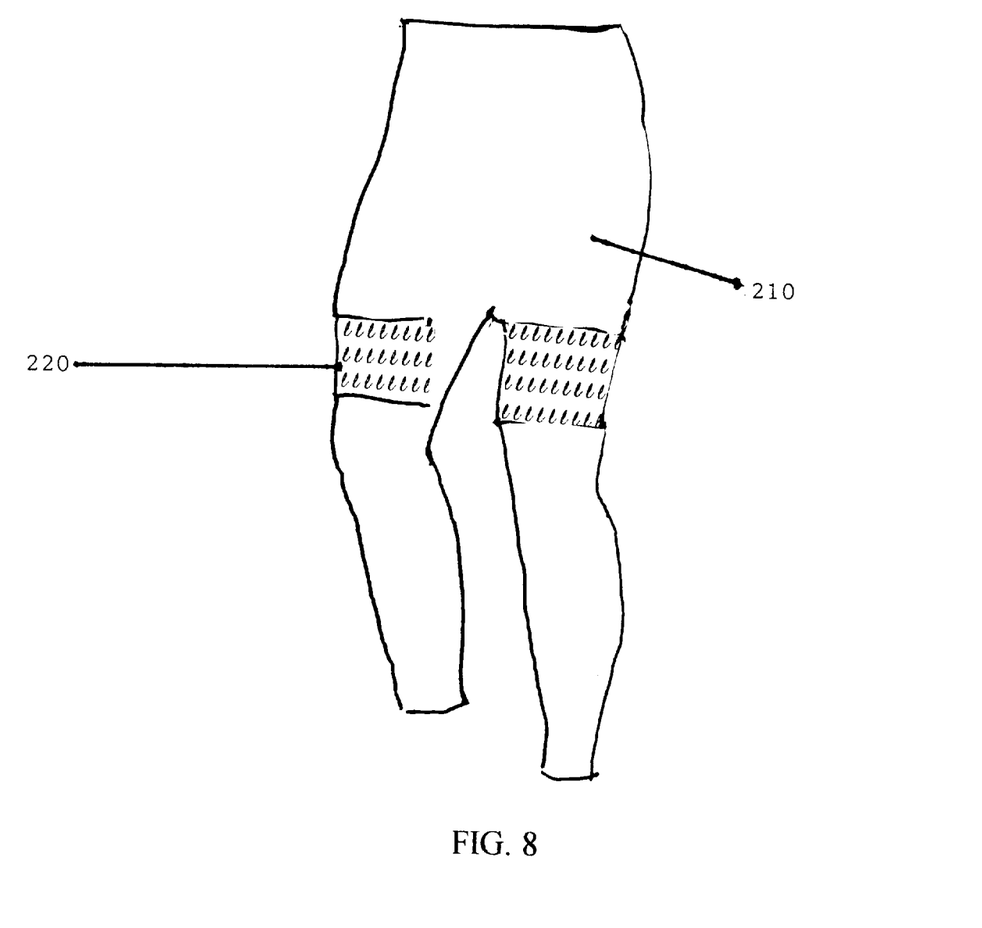
FIG. 8 is a pictorial front view of a second, preferred embodiment of the present invention, consisting of a close fitting garment covering a lower body with loop attachment material irremovably attached to the thighs.
Figure 9:
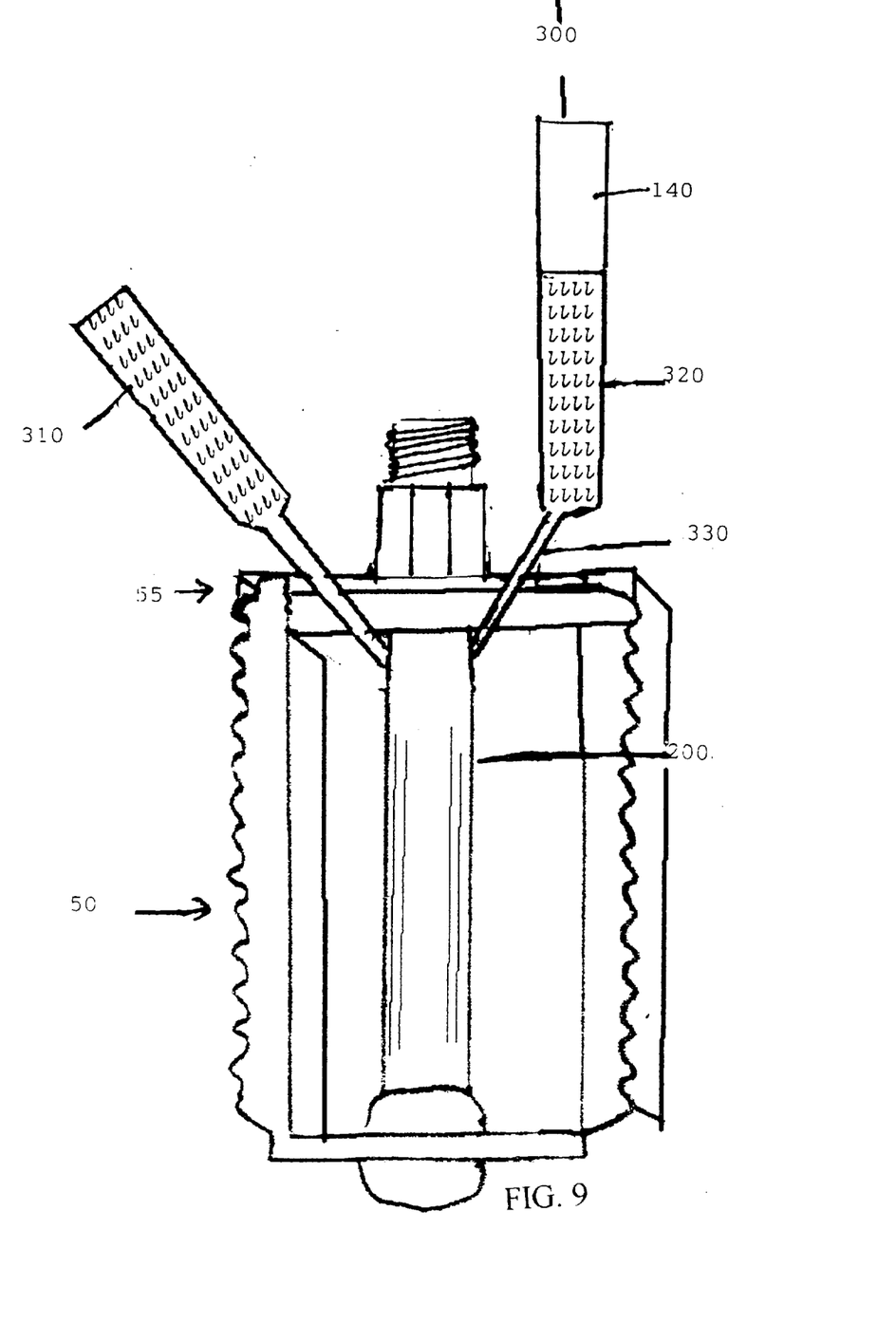
FIG. 9 is an elevated view of an additional method of coupling between the inelastic belt and the inner end of the pedal, eliminating the need for a snap hook.

REFERENCE NUMERALS IN DRAWINGS 20 garment worn by bicyclist (FIG. 1)
30 elastic band encircling thigh (FIG. 1)
40 strong inelastic belt (FIG. 1)
45 front of thigh (FIG. 1)
50 pedal (FIGS. 1, 6, 7, 9)
55 inner end of pedal (FIGS. 6, 7, 9)
65 outer side of thigh (FIG. 1)
75 inner side of thigh (FIG. 1)
80 outer layer of loop attachment material (FIGS. 2A, 4)
85 rear of thigh (FIG. 1)
90 inner layer of elastic material (FIGS. 2B, 4)
100 short strip of hook attachment material (FIGS. 2B, 4)
120 strip of hook attachment material (FIGS. 3A, 5)
130 short strip of loop attachment material (FIG. 3B)
140 strong inelastic belt material (FIGS. 3A, 3B, 5, 9)
150 stitched end of loop (FIGS. 3A, 3B, 5, 6, 7)
160 loop at distal end of belt (FIGS. 3A, 3B, 5, 6, 7)
170 snap hook (FIGS. 6, 7)
180 cord loops (FIG. 7)
200 pedal barrel (FIGS. 6, 7, 9)
210 close fitting garment (FIG. 8)
220 band of loop attachment material (FIG. 8)
300 upper extension of belt (FIG. 9)
310 strip of loop attachment material (FIG. 9)
320 strip of hook attachment material (FIG. 9)
330 narrowed stretch of belt (FIG. 9)

DETAILED DESCRIPTION OF THE INVENTION

Figure 1:
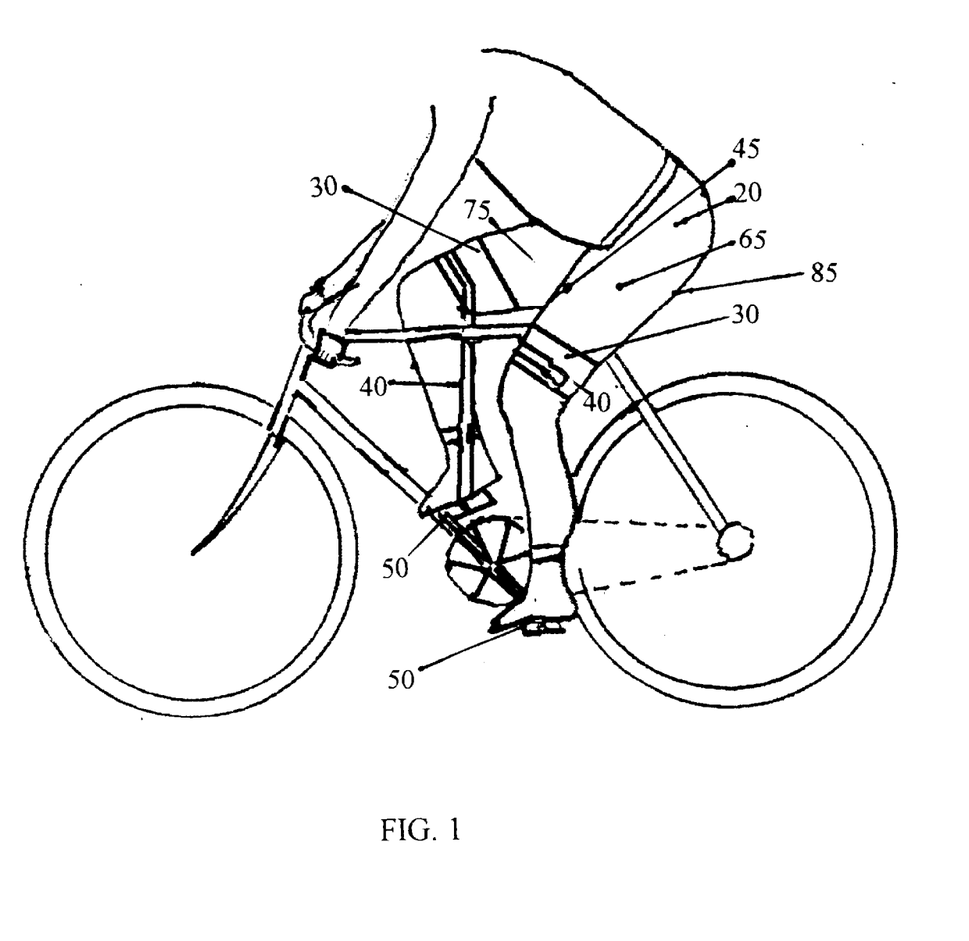
FIG. 1 is an elevated partial side view of the first embodiment of the present invention, coupling a conventional bicycle and a cyclist.
Figure 2A:
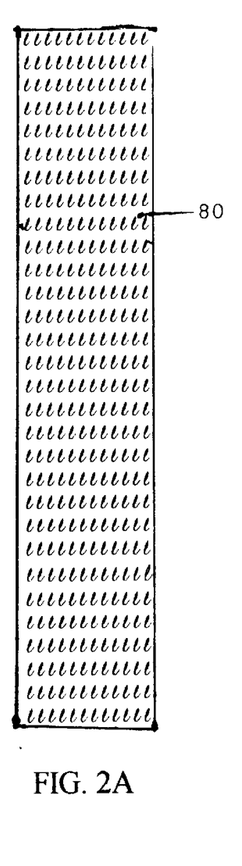
FIG. 2A is a plan view of the outer side of a thigh-encircling elastic band covered with loop attachment material (defined by $l$'s).
Figure 2B:
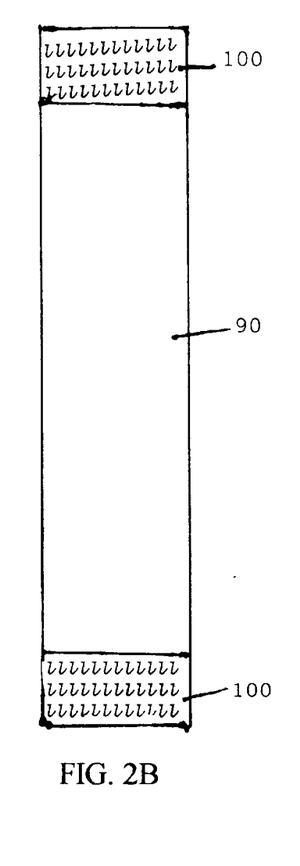
FIG. 2B is a plan view of the inner side of a thigh-encircling elastic band, with proximal and distal ends covered with irremovably attached hook attachment material ($L$'s).
Figure 3A:
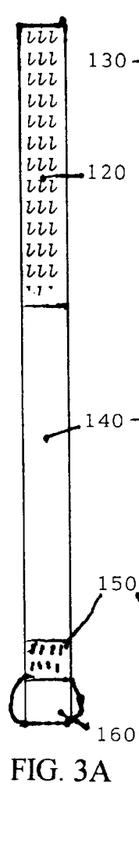
FIG. 3A is a plan view of the inner side of an inelastic belt, designed to couple the thigh with the inner end of the pedal.
Figure 3B:
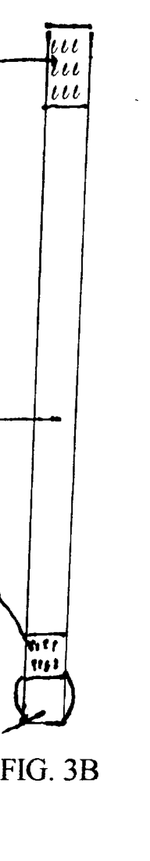
FIG. 3B is a plan view of the outer side of an inelastic belt, designed to couple the thigh with the inner end of the pedal.
Figures 4, 5:
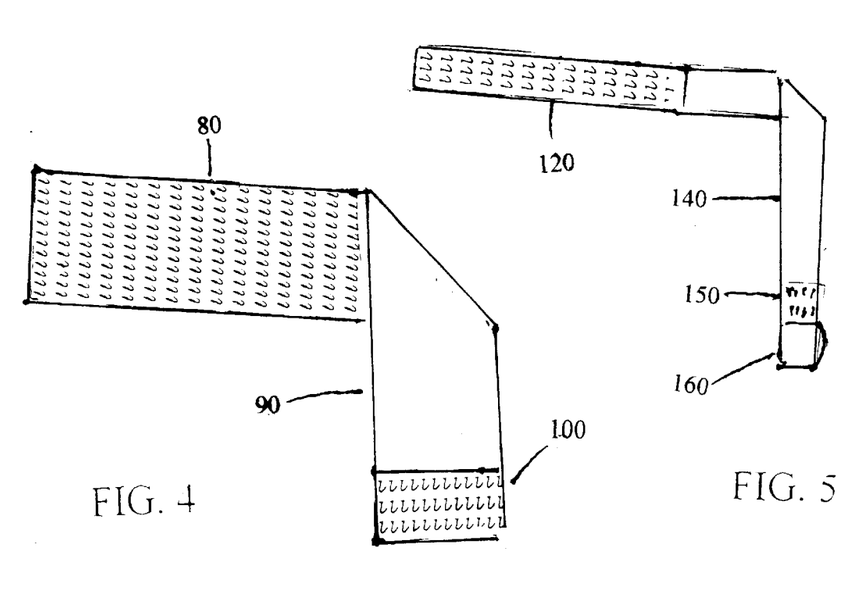
FIG. 4 is an alternate, folded plan view representation of the elastic band shown in FIGS. 2A and 2B.
FIG. 5 is an alternate, folded plan view representation of the inelastic belt shown in FIGS. 3A and 3B.

A partial side view of one embodiment of the invention, coupling a bicycle and rider, is presented in FIG. 1. Elastic bands 30 tightly, but removably, encircle the thighs, which are enclosed by a garment 20. An elastic band, greater than approximately four inches wide and sufficiently long enough to encircle the thigh, is illustrated in FIG. 2A, FIG. 2B and FIG. 4, the elastic band being similar in structure to widely used orthopedic support devices. The outer layer 80 of each band consists of elasticized loop attachment material. The inner layer 90 is preferably composed of elastomeric foam materials such as neoprene foam or urethane foam. The foam layer is laminated with the loop material layer by such means as heat sealing, radio frequency welding or ultrasonic frequency welding. Each elastic band may also be composed entirely of VEL-STRETCH RTM high life cycle elastic loop material. Short strips of hook attachment material 100, FIG. 2B, approximately two inches or more wide, are irremovably attached (glued, sewed or welded) at the ends of the inner layer of each elastic band. One strip of the hook attachment material is then joined with the loop material at the opposite end of the band, allowing the band to be fastened tightly about the thigh. The other strip of hook attachment material (100, FIG. 2B) serves as an abrasive, preventing possible slippage of the elastic band relative to the garment material enclosing the thigh. Also to avoid slippage, the garment is preferably composed of coarse material such as denim or corduroy.

Figure 6:
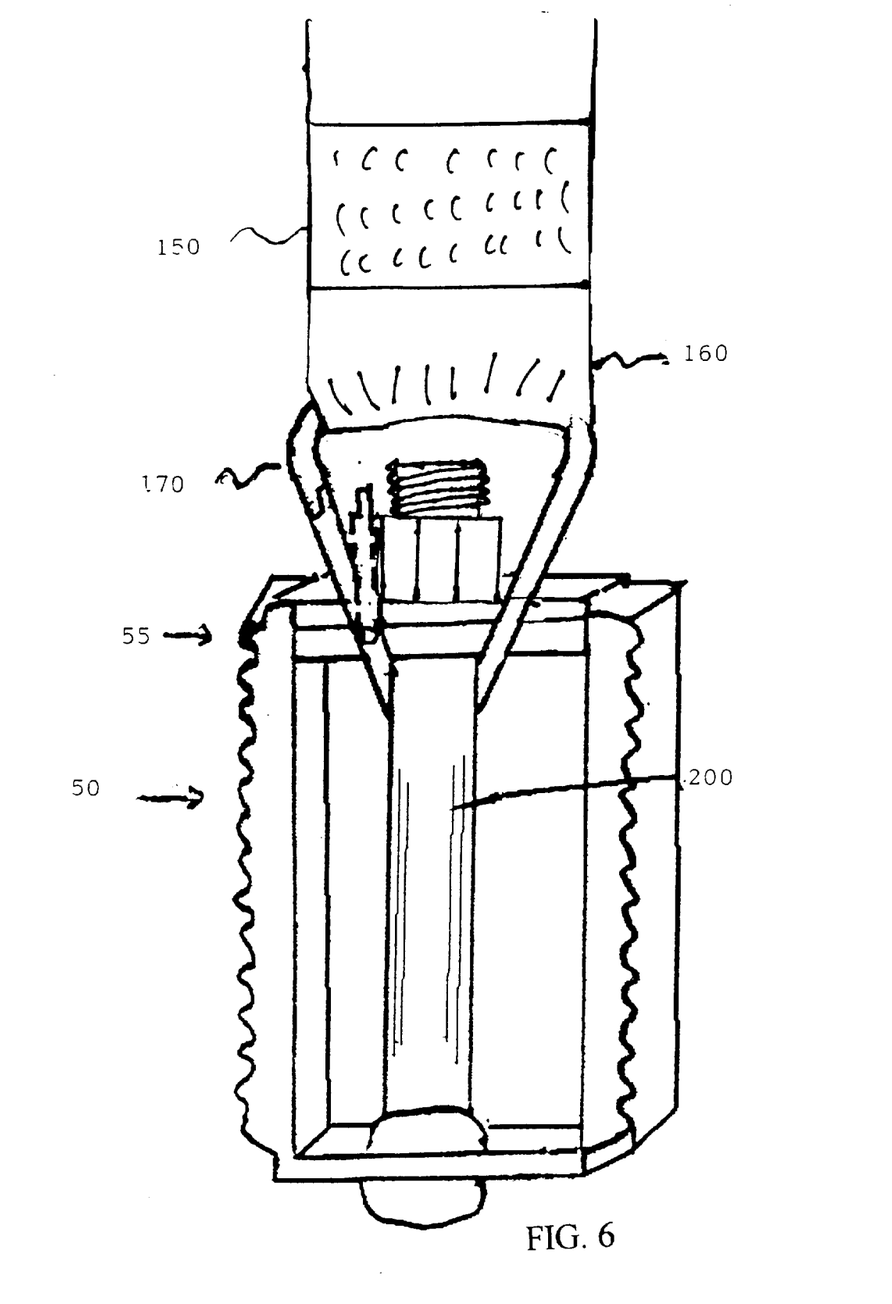
FIG. 6 is an elevated view of one embodiment of the coupling between the inelastic belt and the inner end of the pedal.

Returning to FIG. 1, the belts 40 extend from the bands 30 to the inner ends of the pedals 50. The belts, shown in greater detail in FIG. 3A, FIG. 3B and FIG. 5, sufficiently long enough to reach from the outer side of the thigh 65 to the inner end of the bicycle pedal (55, FIG. 6) have an inside, FIG. 3A, an outside, FIG. 3B, a proximal end (top of FIGS. 3A and 3B) and a distal end (bottom of FIGS. 3A and 3B). The belts are approximately two inches or more wide and, for strength, satisfactorily composed of strong nylon material 140 such as military web belt material or automobile seat belt material. The distal end of each belt is folded and sewed 150 into a loop 160. As shown in FIG. 6, this loop is slipped onto the wide end of the snap hook 170. A strip of inelastic hook attachment material (120, FIG. 3A), approximately eight inches or more long and equal to or greater than the width of the belt, is irremovably attached (for example, sewed, glued or welded) to the inside, proximal end of each belt. Short stretches of loop attachment material (130, FIG. 3B), are irremovably attached to the outside, proximal ends of the belts. These short stretches of loop material can be attached to the hook material on the other belt and hung over the bicycle frame when the bicycle is not being used, preventing the belts from falling to the ground.

Shown in FIG. 4 is an alternate, folded representation of the elastic band depicted in FIGS. 2A and 2B. Shown in FIG. 5 is an alternate, folded representation of the inelastic belt depicted in FIGS. 3A and 3B.

Figure 7:
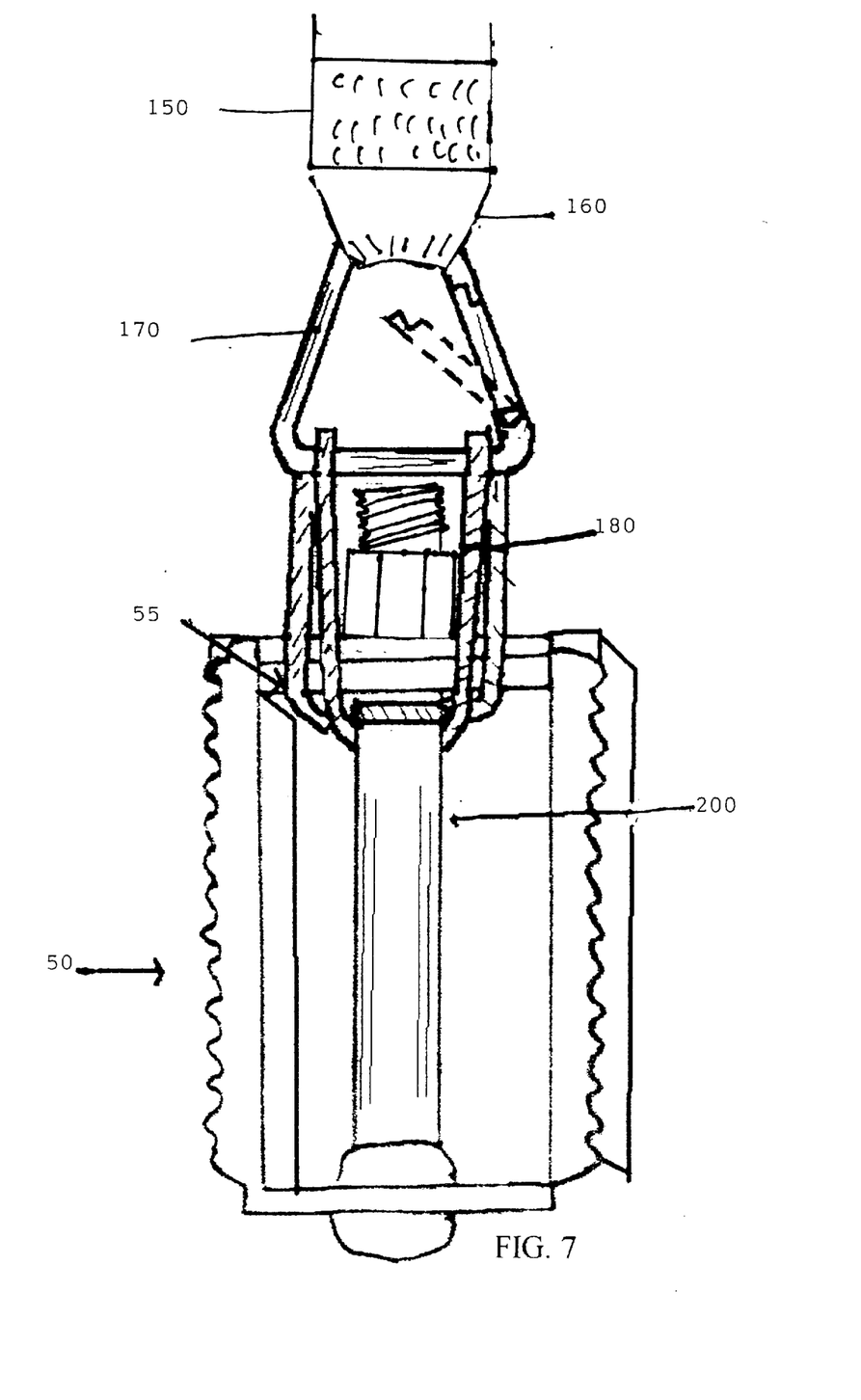
FIG. 7 is an elevated view of a preferred, alternate coupling between the inelastic belt and the inner end of the pedal.

Shown in FIG. 6 is the union between the snap hook 170 and the inner end 55 of a pedal 50. The narrow end of the snap hook is snapped under the pedal barrel 200 while the wide end is snapped inside the belt loop 160. Stitching 150 to form the belt loop is also indicated. An alternate, preferred, attachment of the snap hook to the pedal, preventing metallic connection noise, is shown in FIG. 7. In this case, a cord is tied (for example, using a non-slip, bowline knot) into loops 180 extending from the pedal barrel 200 to the snap hook 170, and the snap hook is removably attached to these loops.

In another, preferred, embodiment of the invention, presented in FIG. 8, elastic or inelastic bands of material 220 covered with loop attachment material are irremovably attached (for example, by glue or ultrasonic welding) to close-fitting garments 210, designed to cover the thighs. The bands of material are preferably four inches or more wide and extend, while the cyclist is sitting, approximately from the center of the rear of the thigh over the outer thigh (65, FIG. 1), over the front of the thigh, and approximately halfway down the inner thigh (75, FIG. 1). Examples of the required close-fitting garments 210 are close-fitting jeans or sweatpants and garments made of a stretch fabric such as LYCRA or Spandex. Another method for this embodiment is to compose the entire thigh-enclosing garment with elastic loop attachment material.

In a third embodiment, shown in FIG. 9, the need for the snap hook is eliminated. The belt is narrowed (for example, by folding or rolling and gluing) near the distal end of the belt, and the narrowed stretch 330 is passed under the inner end of the pedal barrel 200. Loop attachment material 310, eight inches or more long, is irremovably attached (glued, sewed or welded) to the distal end of the belt and removably attached to hook attachment material 320 which is irremovably attached to the other side of the narrowed stretch of belt. The belt continues upward 300 to its proximal end.

OPERATION

The operation of the invention is identical for each embodiment and proceeds in the following steps:

1. The cyclist straddles the motionless bicycle and lifts one foot to its pedal.
2. Referring to FIG. 1, the cyclist pulls the belt 40 over the thigh and attaches its proximal hook strip (120, FIG. 3A) loosely to the thigh band's loop material (80, FIG. 2A).
3. The first foot is returned to the ground and steps 1 and 2 are repeated for the second foot.
4. The bicycle is pushed off by the first foot and downstroke cycling is begun.
5. After a short cycling interval, coasting is begun and one of the thighs is raised to its maximum height.
6. The proximal hook strip (120, FIG. 3A) is lifted from the thigh, pulled tight, and firmly reattached to the loop material (30, FIG. 1) fastened to the thigh.
7. Steps 5 and 6 are repeated for the other thigh.
8. There are two common choices after pedaling is resumed:
   (a). Concentration on maintaining a smooth, uninterrupted force on the pedals. The upstroke is maintained on one pedal while the downstroke is being performed on the other pedal.
   (b). Interrupted upward and downward thrusts on the pedals. Minimal force is applied at the top and bottom of each stroke.
9. Stand-up pedaling takes place when rapid acceleration or the climbing of steep slopes is desired. In these cases, only the downward stroke is significant, utilzing the full weight of the body for the propulsive force. The belt, slightly loosened, remains on the thigh during these events, and seated cycling easily resumes after they are completed, the belt being re-tightened.
10. It should be understood by the user of this invention that practice is needed in order to achieve an optimal coordination of leg up-thrusts and down-thrusts and a resultant increase in force on the pedals. Practice is also needed in adjusting the belt attachment to the thigh for optimal power while maintaining comfort and for building leg strength.

Although the above invention contains many detailed descriptions in regard to the preferred embodiments, many variations and modifications exist within the scope of the invention, and such variations and modifications (for example, the references to hook and loop attachment can be reversed) should be obvious to anyone skilled in the art, without departing from the spirit and scope of the present invention. The scope of the invention is described and defined in the claims which follow (reference numerals included for clarity).

I claim:

1. A thigh to pedal auxiliary propulsion system for a bicycle which utilizes the upward thrust of the thigh of the cyclist to apply upward force on a bicycle pedal (50) comprising:

a substantially flexible elastic band (30) sufficiently long enough to encircle said thigh, having opposite first and second ends and inner and outer surfaces, said outer surface being composed of loop attachment material (80), and strips of hook attachment material (100) being irremovably attached to said first and second ends of said inner surface, one end of said inner surface being releasably attached to the opposite end of said outer surface by hook and loop attachment means, thus tightly encircling said thigh with said band;

a flexible inelastic belt (40), having opposite proximal and distal ends and inner and outer surfaces, said belt being narrower than said band and sufficiently long enough to reach from the the outer side (65) of said thigh over the front (45) of said thigh to the inner end (55) of said bicycle pedal (50), a strip of said hook attachment material (120) being irremovably attached to said inner surface of said proximal end of said inelastic belt, said inner surface of said proximal end of said inelastic belt being adjustably and removably coupled by hook and loop attachment means to said outer surface of said band encircling said thigh, said distal end of said inelastic belt being fastened into a loop (160);

means for coupling said loop at said distal end of said inelastic belt with said inner end of said bicycle pedal, comprising a snap hook (170) having a wide aperture approximately the same width as said inelastic belt and a narrow aperture wider than the bicycle pedal barrel (200), said narrow aperture of said snap hook being attached to the inner end of said pedal barrel and said wide aperture of said snap hook being snapped into said loop at said distal end of said inelastic belt.

2. The thigh to pedal auxiliary propulsion system of claim 1, wherein said inelastic belt (40) is made from strong webbing material (140).

3. The thigh to pedal auxiliary propulsion system of claim 1, wherein said flexible elastic band (30) is composed of inner and outer layers, said outer layer of said elastic band being an unbroken stretchable loop fabric (80) and said inner layer of said elastic band being composed of elastic material (90).

4. The thigh to pedal auxiliary propulsion system of claim 3, wherein said inner layer and said outer layer of said elastic band are intimately bonded.

5. A thigh to pedal auxiliary propulsion system for a bicycle ridden by a cyclist wearing a close fitting garment (210) enclosing the thigh, said propulsion system utilizing the upward thrust of said thigh to apply upward force on a bicycle pedal (50), and comprising:

a band (220) of flexible material having inner and outer surfaces, said outer surface being covered with a multiplicity of upwardly extending loops and said inner surface extending over and irremovably attached to the surface of said close fitting garment (210) enclosing said thigh of said bicyclist;

a flexible, inelastic belt (40), having opposite proximal and distal ends and inner and outer surfaces, said belt being narrower than said band (220) attached to said surface of said close fitting garment and longer than the approximate distance from the outer side (65) of said thigh of a seated cyclist over the front (45) of said thigh to the inner end (55) of said bicycle pedal (50), a strip of hook attachment material being irremovably attached to said inner surface of said proximal end of said inelastic belt, said proximal end of said inelastic belt being adjustably and removably coupled by hook and loop attachment means to said loop surface of said band (220) attached to said close fitting garment, said distal end of said inelastic belt being fastened into a loop (160);

means for coupling said loop at said distal end of said belt with said inner end of said bicycle pedal, comprising a snap hook (170) having a wide aperture approximately the same width as said inelastic belt and a narrow aperture wider than the bicycle pedal barrel, one aperture of said snap hook being inserted into cord loop (180) wrapped around said inner end of said pedal barrel, and other aperture of said snap hook being inserted into said loop (160) at said distal end of said inelastic belt.

6. The thigh to pedal auxiliary propulsion system of claim 5, wherein said inelastic belt is made from strong webbing material (140).

7. A thigh to pedal auxiliary propulsion system for a bicycle which utilizes the upward thrust of the cyclist's thigh to apply upward force on a bicycle pedal, comprising:

a substantially flexible band of material having inner and outer surfaces, said band extending from the outer thigh (65) of said cyclist over the front (45) and inner (75) thigh of said cyclist, said outer surface of said band being covered with a multiplicity of upwardly extending loops and said inner surface of said band being attached to the garment enclosing the thigh of said cyclist;

a flexible, inelastic belt (40), having opposite proximal and distal ends and inner and outer surfaces, said belt being narrower than said band and longer than the approximate distance from the rear (85) of said thigh of a seated cyclist over the outer side (65) of said thigh over the front (45) of said thigh to the inner end (55) of said bicycle pedal, a strip of hook attachment material (120) being irremovably attached to said inner surface of said proximal end of said inelastic belt and being adjustably and removably coupled by hook and loop attachment means to said loop surface of said band attached to said garment, said distal end of said inelastic belt being adjustably fastened into a loop by hook and loop attachment means, the central part (330) of said loop being formed by folding a stretch of said flexible belt above said distal end of said belt, said inner surface of said distal end of said belt being irremovably covered with loop attachment material (310), and a stretch of hook attachment material (320) being irremovably attached to said inner surface of said flexible belt above said folded stretch of said belt;

means for coupling said distal end of said flexible, inelastic belt (40) with said inner end (55) of said bicycle pedal (50), comprising the adjustable, removable attachment of said folded stretch (330) of said flexible belt about the inner end of the pedal barrel (200) by said hook(320) and said loop (310) attachment means.

8. The thigh to pedal auxiliary propulsion system of claim 7, wherein said flexible, inelastic belt (40) is made from strong webbing material (140).

\* \* \* \* \*